United States Patent Office 3,390,128
Patented June 25, 1968

3,390,128
RESIN COMPOSITION AND METHOD OF PREPARING SAME, SAID RESIN RESULTING FROM THE REACTION OF BISPHENOL, FORMALDEHYDE AND A SPACED POLYPHENOL
George K. Hughes, Waukegan, William D. Coder, Jr., Barrington, and Milton A. Glaser, Glencoe, Ill., assignors, by mesne assignments, to The Dexter Corporation, a corporation of Connecticut
No Drawing. Filed Nov. 19, 1965, Ser. No. 508,848
13 Claims. (Cl. 260—51)

ABSTRACT OF THE DISCLOSURE

The disclosure relates to synthetic resins, and a method of making such resins by reacting formaldehyde with a bisphenol and a spaced polyphenol containing at least two phenolic groups per molecule, said phenolic groups being joined by aliphatic hydrocarbons of from about 12 to 30 carbon atoms. These resins are suitable for coating and impregnating purposes, and can be used as adhesives or binders, or in molding and laminating materials such as paper or wood or other cellulosic materials or asbestos or the like.

---

This invention relates to synthetic resins, and more particularly to new phenolic type resins and to the method of preparing such resins. In its more specific aspect, this invention relates to heat hardenable resins prepared from formaldehyde or materials that readily yield formaldehyde, a phenolic compound having at least two phenolic groups per molecule and polymethylene polyphenols or spaced polyphenols.

The term "spaced polyphenols" as used herein and in the appended claims refers to polyarylated aliphatic hydrocarbons, and is often referred to in the art as wax phenols. The term spaced polyphenols is defined completely in United States Patents 2,859,203 and 2,859,204, and these materials are manufactured by Koppers Company, Inc. and sold under the trade name of Flexiphen 160. Spaced polyphenols are sometimes referred to as polymethylene polyphenols, and are formed from the controlled addition of phenol or its homologs to selected hydrocarbon chains. A general unit formula is as follows:

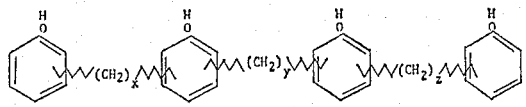

where $x$, $y$ and $z$ range from about 12 to 30 carbon atoms and are not necessarily equal.

Phenol-formaldehyde resins are well known in the art and are used in many applications. More recently, improved resinous products have been obtained by the reaction of a monophenol, formaldehyde, and polymethylene polyphenol or spaced polyphenols.

Resins based on reacting formaldehyde with spaced polyphenols either do not bake to form a resinous film, or bake slowly to a weak, soft and otherwise unsuitable film. When sodium hydroxide is used as the catalyst for the reaction, seediness occurs, and the pH usually drops to the acid side during the initial condensation.

Efforts mare to harden the film by incorporating phenol have been tried without first attempting to methylolate the spaced polyphenols and then adding phenol. Both acid and basic catalysts failed to yield resins with the desired baking and film properties (e.g. coatings that harden in about 10 minutes at about 400° F. to form a hard, flexible film). In addition, the amount of aldehyde and the time of addition were varied, but these failed to produce the desired baking and film properties. When approximately equal parts by weight of phenol and spaced polyphenols are condensed together in the presence of formaldehyde, a two-phase mixture generally results.

This invention provides a new resinous composition suitable for coating and impregnating purposes that exhibits improved properties and hardens within a reasonable baking time. These new resins are formed by reacting formaldehyde or compounds that readily yield formaldehyde, a phenolic compound that must have at least two phenolic groups per molecule, and spaced polyphenols.

We have found quite unexpectedly that the foregoing is accomplished by reacting formaldehyde or compounds that readily yield formaldehyde with spaced polyphenols and a phenolic compound having at least two phenolic groups per molecule and having a relative rate of reaction with formaldehyde similar to that of the spaced polyphenols such that, during the reaction, said phenolic compound or its reaction products do not form a separate phase which normally results when the phenolic compound homopolymerizes. The resins are conveniently prepared by reacting the constituents, for example, at slightly elevated temperatures from a range of about 125° to 375° F., in the presence of a suitable catalyst. If desired, the reaction product may also be produced at room temperature. The improved product is characterized by reasonable baking times and improved film properties, particularly increased flexibility.

Resins of this invention, for example, can be made from the compounds of the above-mentioned type by the following illustrative procedure: The formaldehyde or formaldehyde yielding material, said phenolic compound having at least two-phenolic groups per molecule, and spaced polyphenols are thoroughly admixed along with a suitable solvent in a reaction vessel. A suitable catalyst, which is well known in the art for the formation of phenolic resins, is added. The catalyst can be acid or base, and include, for example, oxalic acid, sulfuric acid, lactic acid, ammonium hydroxide, sodium hydroxide, barium hydroxide or morpholine. Ammonium hydroxide having a strength or about 10 N is particularly desirable. If desired, the mixture may be heated, for example, to about 140° to 150° F. and held at such temperature for a desired length of time, such as about one and one-half hours to allow the formaldehyde to react with the spaced polyphenols. A solvent such as xylene and toluene is then added and the temperature is raised to reflux the admixture and to remove water from the system by azeotropic dehydration. If desired, when the distillation rate has slowed, n-butyl alcohol may be added and the admixture refluxed and the water again trapped and removed. The resulting admixture comprises a substantially homogeneous, clear (although it may be dark) resin solution having a nonvolatile resin content, for example, of about 55 to 65 percent by weight.

The resulting resin reaction product may be applied on metal sheet or plate or foil, plastic, wood or paper surfaces or glass fibers, or on any other suitable substrate, and baked to a glossy flexible film. The bake conditions, for example, may be about 40 seconds up to about 12 minutes at 350° to 600° F., and more, specifically, 10 minutes at 400° F. These resins, when cast into films and baked, yield insoluble tough, glossy, flexible films.

Although formaldehyde is the preferred and most readily available compound, it is understood that compounds which readily yield formaldehyde may be used, and the term "formaldehyde" as used herein and in the appended claims is intended to include these precursors. This would include, for example, paraformaldehyde or hexamethylenetetramine.

The phenolic compound (other than the spaced polyphenols) used in the process of this invention has at least two phenolic groups per molecule and has a rate of reaction with the formaldehyde relatively similar to the spaced polyphenol such that, during the reaction, the phenolic compound or its reaction products do not separate out which normally occurs when the phenolic compound homopolymerizes. The bisphenol compounds are such phenolic compounds and are particularly suitable for use in this invention. Suitable bisphenols include Bisphenol A, Bisphenol B and Bisphenol F. Bisphenol A is chemically known as p,p'-isopropylidene diphenol or 2,2-bis(4-hydroxphenyl) propane. Bisphenol B is chemically known as p,p'-sec.-butylidenediphenol or 2,2-bis(4-hydroxphenyl) butane. Bisphenol F is chemically known as bis(4-hydroxphenyl) methane.

In preparing the resins of the present invention, the ratios of the aforesaid phenolic compound having at least two phenolic groups per molecule to the spaced polyphenols can be varied quite widely depending upon the desired flexibility of the final product. Thus, said phenolic compound may range from about 5 to 95 percent by weight and the spaced polyphenols from about 95 to 5 percent, and more preferably the range is from about 60 to 40 percent to 40 to 60 percent. Generally, a higher weight ratio of said phenolic compound to spaced polyphenols results in a relatively harder film.

The quantity of formaldehyde which may be employed for reaction with mixtures of said phenolic compound and spaced polyphenols will vary depending upon the relative proportions of said phenolic compound and spaced polyphenols employed and upon the composition of the spaced polyphenols. Generally, available formaldehyde is used in the ratio of from 5 to 75 parts to 100 parts of said phenolic compound-spaced polyphenols mixture, but it is possible to use lower or higher amounts of available formaldehyde. The lower ratios of formaldehyde result in resins with less tendency to heat harden, while the use of excessively high amounts results in having unreacted aldehyde at the end of the reaction.

If desired, a suitable alcohol may be incorporated with the reaction mixture to lower the viscosity of the resin product and enhance the compatibility or solubility of the reaction constituents, as well as the resin product itself with other materials that may be later added to or admixed with the resin. For this purpose, the lower aliphatic alcohols having from three to 12 carbon atoms per molecule (e.g., n-butyl alcohol) are particularly desirable. It is thought that the alcohol enters into the reaction.

In inducing or promoting the reaction of the reaction mixture, it is convenient to use a temperature in the range of from about 125° to 375° F. When low temperatures are used it may be necessary or desirable to use a larger amount of catalyst in order to effect the reaction. Care must be taken to avoid the use of high temperatures which produce gellation or the formation of an insoluble product.

The following examples will further illustrate our invention.

Example 1

To a three neck resin flask equipped with a thermometer, agitator, and Dean and Stark trap, were charged 505 grams of n-butyl formcel, which comprises a 40% solution of formaldehyde in 53% of n-butanol and 7% of water. To this was added 352.5 grams of Bisphenol A and 352.5 grams of Flexiphen 160 which was described above (a polymethylene polyphenol made by reacting phenol with a chlorinated hydrocarbon in the presence of a Friedel-Crafts catalyst). The phenol equivalent was about 350 grams. To this mixture was added 35 grams of 10 N ammonium hydroxide as a catalyst. The mixture was heated to 140° F. and held at about this temperature for 1½ hours to allow the formaldehyde to react. Two hundred fifty grams of xylene were then added, and the temperature was raised to reflux and water removed by means of the Dean and Stark trap. When the distillation rate had slowed and about 160 grams of water had been removed, 250 grams of n-butanol were added and the whole mixture was refluxed, allowing the small amount of water to collect in the Dean and Stark trap for an additional hour.

The resulting solution had a nonvolatile content of 58.8% viscosity F (Gardner-Holdt), color greater than 18 (Gardner-Holdt) and weight per gallon 7.92 pounds.

This product was spread on sheet metal and baked for 10 minutes at 400° F. to a hard, glossy, flexible film.

Example 2

A three liter flask, equipped with agitator, thermometer, Dean and Stark trap and condenser, was charged with 50 grams of distilled water, 398 grams of alcohol-free Cellosolve acetate, 221 grams of 91% paraformaldehyde, 395 grams of Bisphenol A, 310 grams of Flexiphen 160 and 35 grams of a 10 N solution of ammonium hydroxide as the catalyst. The temperature was raised to 150° F. and held there for 1 hour, after which the temperature was raised to 190° F. and held for 30 minutes more.

Two hundred grams of toluene were then added and the batch was held at reflux using the Dean and Stark trap to remove water and return toluene to the flask. When the evolution of water was slow, the batch became very viscous. It was then thinned with 300 grams of diacetone alcohol. About 185 grams of water had been collected. The viscosity was Y at 45.6% N.V.M.

A film of the resulting solution was spread on sheet metal, and baked for 10 minutes at 400° F. The resulting film was tack free and flexible.

Example 3

To a three liter, three neck flask, equipped with agitator, thermometer, Dean and Stark trap and condenser, were charged 757.5 grams of n-butyl formcel, 592.5 grams of Bisphenol A, 465 grams of Flexiphen 160 and 52.5 grams of morpholine as the catalyst. The batch was heated to 150° F. and held for three hours. At this point, 300 grams of xylene were added and the temperature raised to reflux with the water being separated in the trap. When the water collected slowly (260–270 grams), 450 grams of n-butanol were added and the refluxing and trapping of water was continued for one hour. It was then cooled and strained. The viscosity was J at 64%.

A film was formed on metal and was baked for 10 minutes at 400° F. The resulting film was flexible and tack free.

Example 4

Two hundred fifty-four grams of butyl formcel, 228 grams of Bisphenol A and 228 grams of Flexiphen 160 were charged to a two liter, three neck flask equipped with thermometer, agitator, and Dean and Stark trap and condenser. Five grams of oxalic acid as the catalyst were added and the temperature raised to 140° to 150° F. and held there for 1½ hours. One hundred ninety-four grams of toluene were added, and the batch was refluxed with removal of water until distillation slowed. One hundred grams of n-butanol were added, and refluxing and trapping of water was continued for 2 hours. The reaction mixture was cooled and strained, and a clear solution was obtained.

A sample of the resulting solution was baked for 10 minutes at 400° F. to form a tack free, flexible film.

Example 5

Two hundred eighty-six grams of butyl formcel, 200 grams of Bisphenol F, 200 grams of Flexiphen 160, and 20 grams of 10 N ammonium hydroxide as catalyst were charged to a two liter, three neck flask equipped with a thermometer, agitator and Dean Stark trap with condenser, as in the previous examples.

The mixture was heated to about 140° to 150° F. and held at that temperature of 1½ hours when 142 grams of xylene were added. The batch temperature was raised to reflux and water was trapped until the rate was slow. One hundred forty-two grams of n-butanol were added and the refluxing and water removal continued for 1 hour. The reaction mixture was then cooled and strained.

A clear solution was obtained and was spread on sheet metal and baked for 10 minutes at 400° F. The resulting film was tack free and was flexible.

Example 6

Seven hundred fifty-seven grams of butyl formcel, 465 grams of Flexiphen 160 and 593 grams of Bisphenol A were charged to a three liter three neck flask equipped with a thermometer, agitator and a Dean and Stark trap with condenser. Five grams of sodium hydroxide as catalyst were added as a twenty percent solution. The temperature was raised to 140° F. and held at 140–150° F. for 1½ hours. The batch was then cooled, and the pH was adjusted to about 5.5 with 1-1 sulfuric acid and to about 3.5 with 50% lactic acid solution. Three hundred grams of toluene were then added. The temperature was raised to reflux and water removed by means of the Dean and Stark trap until the temperature reached 250° F. and 220 grams of distillate had been collected. Four hundred fifty grams of butanol were added and refluxing and trapping of water continued until the rate of distillation of water was quite slow which took about 2½ hours. The reaction mixture was then cooled and filtered.

A film of the solution was baked for 10 minutes at 400° F. The resulting film was tack free and flexible.

Example 7

A 3 liter, three neck flask equipped with thermometer, agitator and Dean and Stark trap was charged with 757.5 grams of butyl formcel, 592.5 grams of Bisphenol A and 465 grams of Flexiphen 160. To catalyze the reaction, 52.5 grams of 10 N ammonium hydroxide were added. The temperature was raised to 140° F. and held at 140–150° F. for 1½ hours. At this point, 300 grams of xylene were added and the batch was heated to reflux and held with trapping of water until distillation was slow. Four hundred fifty grams of n-butanol were then added and the refluxing and water trapping was continued for 1½ hours more. After cooling and straining, the solution was used to coat a metal panel.

The film was baked for 10 minutes at 400° F. and the resulting film was tack free and flexible.

Example 8

Four hundred grams of a 61% solution of resinous solution prepared in accordance with Example 1 were charged to a pebble mill together with 400 grams of titanium dioxide pigment. The mill was placed on a roller and grinding continued for 48 hours.

The product was baked for 10 minutes at 400° F. to form a tack free, flexible pigmented film.

Example 9

A 2 liter, three neck flask equipped with thermometer, agitator and Dean and Stark trap and a condenser, was charged with 500 grams of n-butyl formcel and 310 grams of Flexiphen 160. 3.3 grams of sodium hydroxide (as a 20 percent solution of sodium hydroxide) were added as a catalyst. The mixture was heated to 140° F. and held at that temperature for 1.5 hours. At this point, 392 grams of Bisphenol A were added and the heating at 140° F. continued for an additional 1.5 hours. The temperature was then lowered to 100° F. and a 50 percent solution of sulfuric acid was added to adjust the pH to 5–6, followed by the addition of a 50 percent solution of lactic acid to adjust the pH to 3–3.2. 198 grams of toluene were then added and the batch was held at reflux with azeotropic removal of water until the distillation rate of water was low. 297 grams of n-butanol were then added and refluxing and distillation of water continued for one hour. After cooling and straining, a clear homogeneous solution resulted.

The resin was applied as a film on a metal base and formed a tack free, flexible film after being heated for 10 minutes at 400° F.

Example 10

A 2 liter, three neck flask equipped with thermometer, agitator and Dean and Stark trap and a condenser, was charged with 500 grams of n-butyl formcel, 310 grams of Flexiphen 160 and 392 grams of Bisphenol A. Agitation was started and 34.7 grams of 10 N ammonium hydroxide were added. Agitation was continued for 2 hours and then stopped, after which the mixture was allowed to stand at room temperature for about 22 hours. 198 grams of toluene were then added and the batch was heated and water removed by azeotropic distillation until the rate of distillation of water was low. 297 grams of n-butanol were then added and heating and distillation continued for 1 hour. When the reaction product was cooled and strained, the resulting resin product was clear and homogeneous.

The resin was spread on a tin plate panel and formed a tack free, flexible film after being heated for 10 minutes at 400° F.

Resins made in accordance with this invention may be used, with or without a filler, as an adhesive or binder, or as molding and laminating materials, and, as illustrated above, may be pigmented for greater versatility. The resins may be used, for example, to coat or impregnate paper or other cellulosic materials such as wood or cloth, or such materials such as asbestos.

Various changes and modifications of the invention can be made and, to the extent that such variations incorporate the spirit of this invention, they are intended to be included within the scope of the appended claims.

Having described our invention, and certain embodiments thereof, we claim:

1. A resin comprising the reaction product of formaldehyde, spaced polyphenols of the following unit formula:

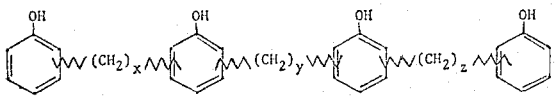

wherein $x$, $y$ and $z$ are independent integers from about 12 to about 30, and a bisphenol having a rate of reaction with formaldehyde relatively similar to that of said spaced polyphenol such that said phenolic compound or its reaction products do not separate out during reaction as a separate phase.

2. A molding composition comprising the product of claim 1 and a filler.

3. An article of manufacture comprising the resinous product of claim 1 and a pigment.

4. A resin comprising the reaction product of formaldehyde, spaced polyphenols of the following unit formula:

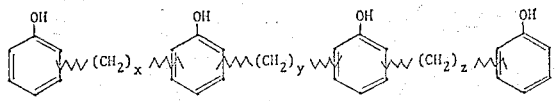

wherein $x$, $y$ and $z$ are independent integers from about 12 to about 30, and bisphenol.

5. A resin according to claim 4 wherein said bisphenol is Bisphenol A.

6. A resin according to claim 4 wherein said bisphenol is Bisphenol B.

7. A resin according to claim 4 wherein said bisphenol is Bisphenol F.

8. The method of preparing a resinous reaction product comprising reacting about 95 to 5 parts by weight of spaced polyphenols of the following unit formula:

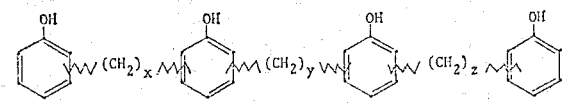

wherein $x$, $y$ and $z$ are independent integers from about 12 to about 30, about 5 to 95 parts by weight of a bisphenol having a rate of reaction with formaldehyde relatively similar to that of said spaced polyphenols such that, during reaction, said phenolic compound or its reaction products do not form a separate phase, and about 1 to 15 parts by weight of formaldehyde for each part by weight both said phenolic compound and spaced polyphenols.

9. The method according to claim 8 wherein the range of bisphenol is from 60 to 40 parts by weight and the range of spaced polyphenols is from 40 to 60 parts by weight.

10. The method according to claim 8 wherein the bisphenol is Bisphenol A.

11. The method according to claim 8 wherein the bisphenol is Bisphenol B.

12. The method according to claim 8 wherein the bisphenol is Bisphenol F.

13. The method of preparing a resinous reaction product by reacting at a temperature of from about 125° to 375° F. from 40 to 60 percent by weight of spaced polyphenols of the following unit formula:

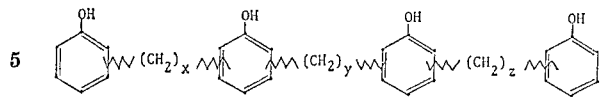

wherein $x$, $y$ and $z$ are independent integers from about 12 to about 30, from 60 to 40 percent by weight of bisphenol having a rate of reaction with formaldehyde relatively similar to that of said spaced polyphenols such that, during reaction, bisphenol or its reaction products do not form a separate phase, and from 5 to 75 parts of formaldehyde to 100 parts of both bisphenol and spaced polyphenols.

References Cited

UNITED STATES PATENTS 2,859,204   11/1958   Florentine et al. _____ 260—51

WILLIAM H. SHORT, *Primary Examiner.*

H. E. SCHAIN, *Assistant Examiner.*